J. MARTIN.
HAY RAKE AND TUMBLER.
APPLICATION FILED FEB. 25, 1911.

1,044,213.

Patented Nov. 12, 1912.

3 SHEETS—SHEET 2.

Witnesses

Inventor
Joseph Martin

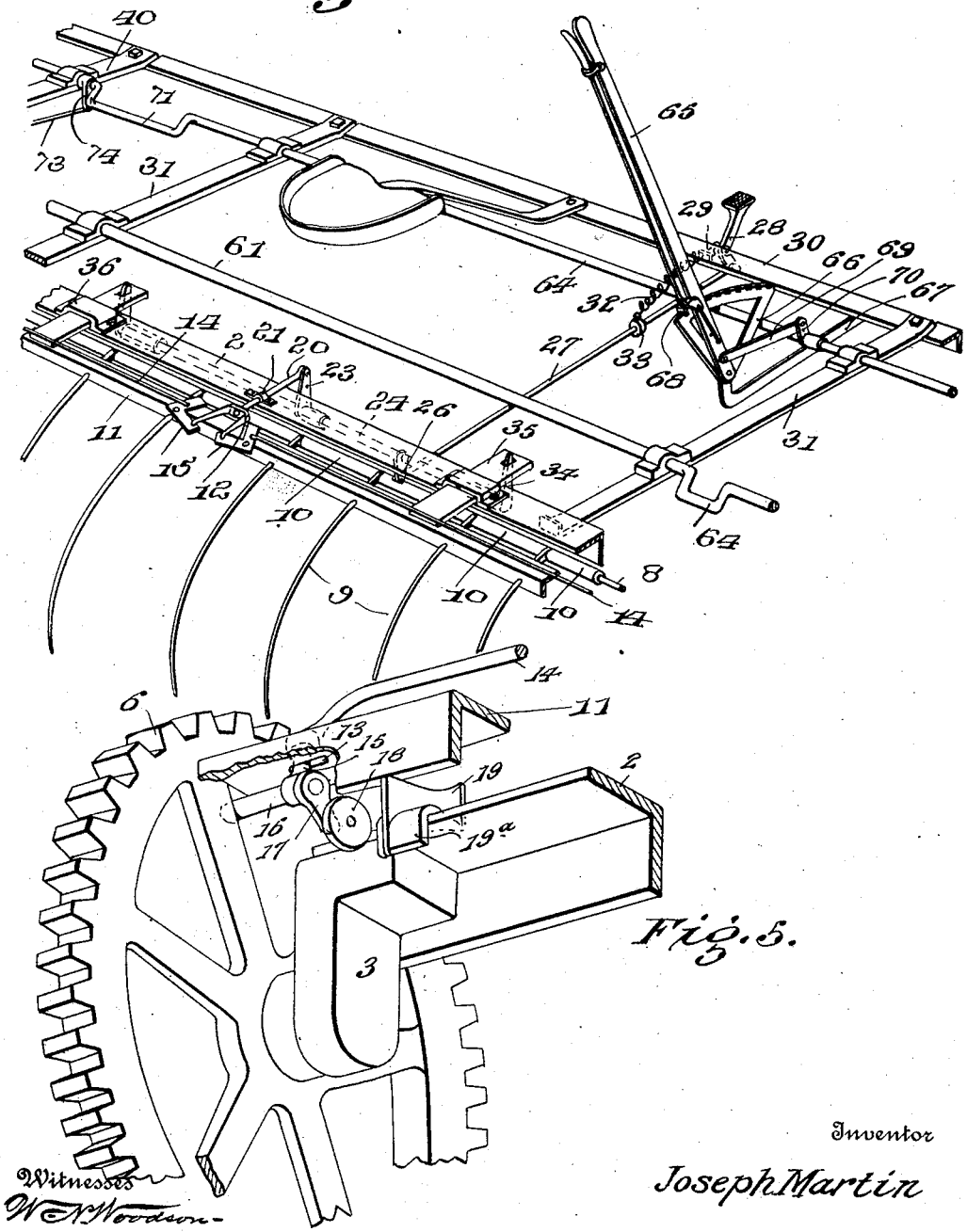

UNITED STATES PATENT OFFICE.

JOSEPH MARTIN, OF WATERBURY, VERMONT.

HAY RAKE AND TUMBLER.

1,044,213.  Specification of Letters Patent.  Patented Nov. 12, 1912.

Application filed February 25, 1911. Serial No. 610,869.

*To all whom it may concern:*

Be it known that I, JOSEPH MARTIN, citizen of the United States, residing at Waterbury, in the county of Washington and State of Vermont, have invented certain new and useful Improvements in Hay Rakes and Tumblers, of which the following is a specification.

My invention relates to agricultural machinery and particularly to rakes designed for raking up straw, hay or other like material.

The primary object of this invention is to provide a raking machine of the character stated having means by which the hay or other material being raked is not only raked up in windrows but is simultaneously raked or tossed laterally to gather the hay into loose masses called "tumbles" thus doing away with the two separate steps of raking the hay into windrows and then bunching it into tumbles preparatory to forming hay cocks.

A further object is to provide a horse rake so constructed that the rake is lifted at any desired interval by the draft of the horse and not by manual actuation, and to provide in connection therewith detents shiftable when the rake is lifted to hold the rake in its lifted position.

A further object is to provide means whereby the main rakes and tumbling rakes may be lifted and held elevated when it is desired to put the mechanism out of operation or when it is desired to back the rake.

A still further object is to provide means whereby the tumbling rakes may be held from lateral oscillation whenever desired.

Further objects will be disclosed in the course of the following specification.

Figure 1:
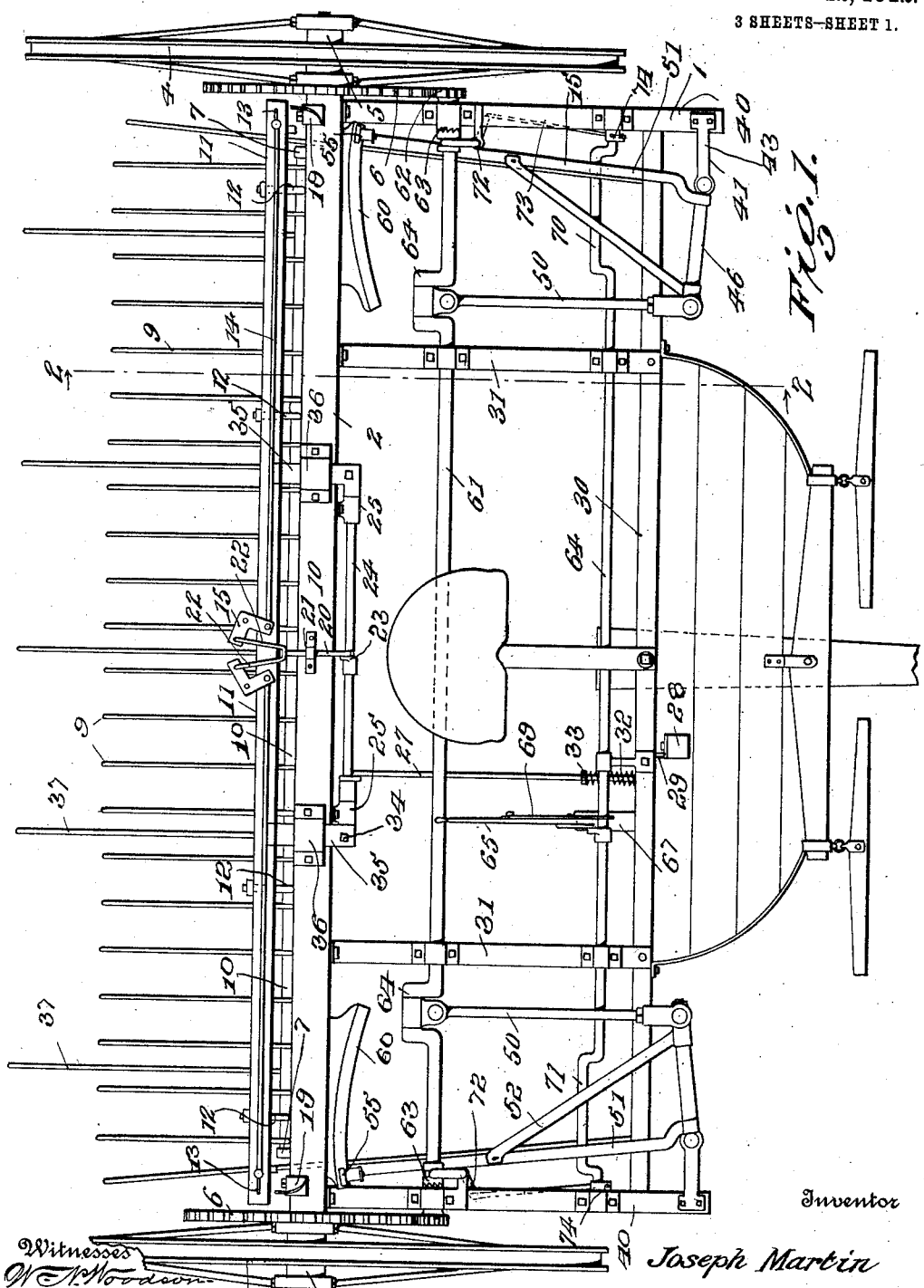
Figure 2:
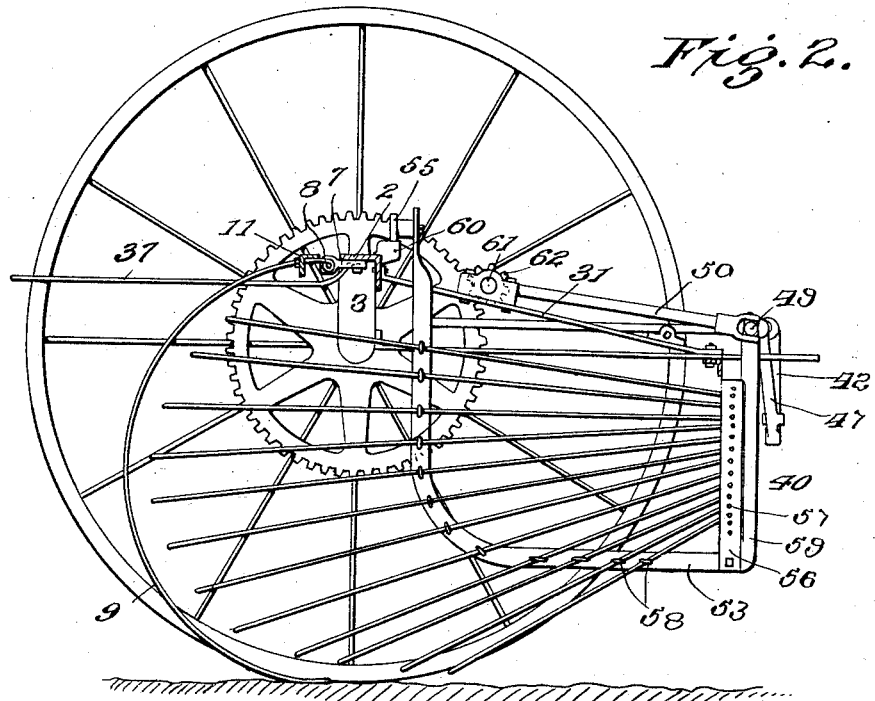
Figure 4:
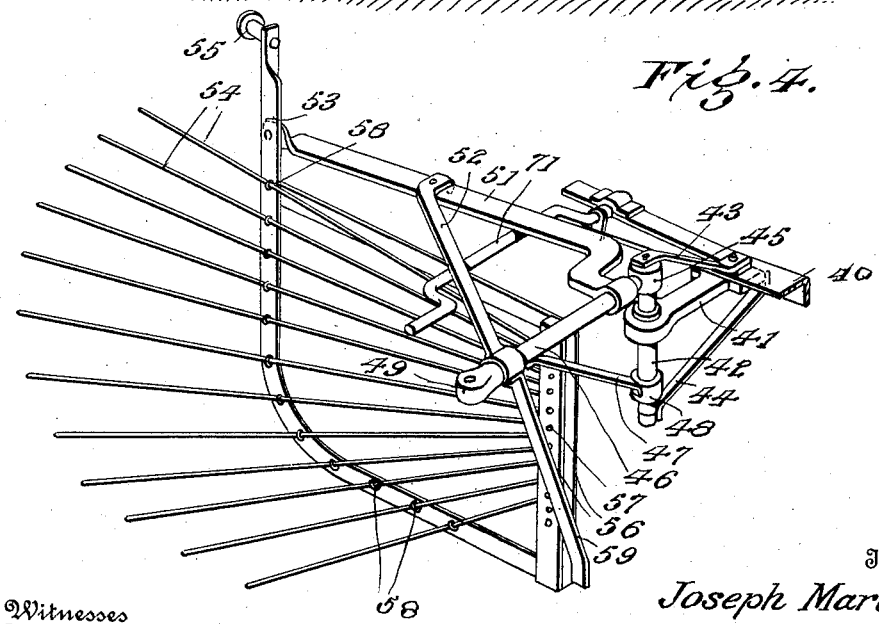

An embodiment of my invention is shown wherein:

Figure 1 is a plan view of a rake constructed in accordance with my invention. Fig. 2 is an elevation thereof. Fig. 3 is a fragmentary perspective view of the main rakes and the mechanism for raising or lowering the same. Fig. 4 is a perspective view of one of the tumbling rakes and a portion of the mechanism whereby it is actuated. Fig. 5 is a fragmentary perspective view of the tumbling rake operating gear wheel and the means whereby the main rakes are connected thereto and disconnected therefrom.

Corresponding and like parts are referred to in the following description and indicated in all the views of the accompanying drawings by the same reference characters.

The rake as illustrated is designed to be made of light iron and steel.

Referring to the figures, 2 designates a transverse angle bar forming the fixed axle of the machine, the extremities of the bar 2 as illustrated in Fig. 5 being provided with downwardly extending brackets 3 upon which the axles of the wheels 4 are formed. The wheels 4 rotate upon these axles. While I do not wish to be limited to any particular make or structure of wheel, I have shown these wheels as being provided with the loose hubs 5 carried upon the axle and with skeleton spokes and wheel rims. Inasmuch as the detailed structure of these wheels is not a part of the present invention, further description is unnecessary. Mounted upon the hubs 5 of each of the wheels is a toothed gear wheel 6, this gear wheel being designed to rotate with the traction wheels 4.

Carried upon brackets 7 attached to the under side of the angle iron 2 and disposed rearwardly thereof is a transverse rod 8 upon which the rake teeth 9 are mounted. These rake teeth are of ordinary form and extend outward, downward and rearward in a semicircle. The upper ends of the rake teeth are bent loosely around the rod 8 and the rake teeth are spaced from each other by spacing sleeves 10, as shown in Fig. 1 so that the rake teeth may be easily raised or lifted upon the rod 8 as a pivotal center. The rake teeth 9 pass through a transversely extending angle iron 11, this angle iron being provided with forwardly extending brackets or links 12 which are bent loosely around the rod 8 as illustrated in Fig. 1. The transverse angle bar 11 acts to hold the rake teeth in proper spaced position and also acts to lift the rake teeth 9 simultaneously.

The opposite extremities of the angle iron or bar 11 are longitudinally slotted as at 13, this being particularly well shown in Fig. 5, and supported upon the upper face of the angle iron 11 are the longitudinally extending bolt-actuating rods 14. These rods at their inner ends are connected to bell crank levers 15 supported upon the angle iron 11, these bell crank levers being in turn connected to the actuating devices as will be later described.

The outer extremity of each rod 14, as illustrated in Fig. 5, is provided with a downwardly extending stud 15 which passes through the slot 13 and carries upon it the outwardly extending bolt 16, which when projected is adapted to engage with the gear wheel 6. As illustrated, this bolt 16 is adapted for engagement with one of the spokes of the gear wheel 6 but it might be so disposed as to engage with one of the teeth upon the periphery of the gear wheel. Also mounted upon the downwardly extending stud 15 is an arm 17 carrying upon it the roller 18. This arm and roller are rigid with the pin 16 and the rod 14 so that the arm, roller, pin and rod all move together.

Attached to the face of the angle iron 2 forming the axle is a cam 19, this cam being so disposed that it lies in the path of movement of the roller 18 and so formed that as the roller 18 is moved into engagement with the cam, the cam will exert a lateral force upon the roller 18 which will withdraw the bolt 16 from its engagement with the spoke of the wheel. As illustrated, the cam 18 is formed by a vertically disposed plate which is curved, as shown in Fig. 1, toward the front and middle of the machine.

When the bell cranks 15 are moved in one direction, the rods 14 will be forced simultaneously outward, and the bolts 16 carried upon the ends of the rod will be forced into engagement with a spoke of the rotating gear wheel 6 and the rotation of the gear wheel will therefore lift upon the bolt 16 and lift upon the angle iron 11 and carry the rake teeth upward to a fully lifted position where the rake teeth will dump the load. When the bell crank levers 15 are shifted in an opposite direction and to the position shown in Fig. 1, the bars 14 will be retracted, retracting the bolts from engagement with the gear wheels 6 and permitting the rake teeth to drop. Hand-actuated means are provided for shifting the rods 14 and hence it will be seen that I provide means whereby the draft of the horse exerted through the traction wheels 4 will cause the rake teeth to be lifted whenever desired.

The means for operating the bell cranks 15, illustrated in the drawings, is as follows. Mounted upon the upper face of the angle iron 2 is a sliding rod 20 which passes through a guide 21. The rear end of this rod is hooked, and engaging in this hooked end is a yoke 22. It will thus be seen that there is a pivotal engagement between the rear end of the rod 20 and the yoke 22 to allow for the turning movement of the rake teeth as they are lifted.

The rod 20 is attached to an upwardly extending arm 23 attached to a rock shaft 24, mounted in bearings 25 on the transverse angle iron 2. This rock shaft is provided with a downwardly extending arm 26, as illustrated in Fig. 3, which is connected to a push and pull rod 27 which extends toward the front of the machine and at its forward extremity is connected to a foot lever 28 pivoted on a bracket 29 attached to a transverse frame bar 30. This frame bar 30 is connected by frame bars 31 to the angle iron 2.

A spring 32 is attached at one end to the frame bar 30 and at its rear end is connected to a collar 33 mounted on the rod 27. The spring therefore acts against any rearward movement of the rod 27 and tends to draw the rod 27 and foot lever 28 back to their original position. By operating the foot lever 28, the rock shaft 24 is oscillated and through the arm 23 draws upon the rod 20, thereby actuating the bell cranks 15 and thereby forcing the bolts 16 into engagement with the spokes of the wheel 6.

In order to hold the rake and rake bar 11 in either its raised or its lowered position, I provide detents which are operated by the rock shaft 24 and which are withdrawn from or forced into engagement with the rake supporting bar 11.

As shown in Fig. 3, the shaft 24 is provided at its extremities beyond the bearings 25 with the upwardly extending arms 34 which pass through slide plates 35 which form detents heretofore referred to. These sliding plates are mounted in the guides 36 attached to the upper face of the angle iron 2. The upper ends of the arm 34 pass through slots in the sliding plates 35 so as to permit perfect freedom of movement. As illustrated in Fig. 3, the sliding plates 35 extend over the upper face of the rake tooth supporting bar 11 and act to prevent any lifting of the rakes. When, however, the rock shaft 24 is actuated by the lever 28, the sliding plates 35 are withdrawn from their engagement with the upper face of the angle bar 11 so as to permit the bar and the rakes to be lifted into engagement with the spokes of the wheel 6, as previously described. If it is desired to hold the rake teeth elevated, the lever 28 is released and as soon as the teeth have been raised up to within an inch or so of where they will be tripped, the detents formed by the sliding plates 35 will be pushed out underneath the tooth bar 11 by the spring 32 and this will hold the teeth up until the foot lever 28 is again pushed.

Attached to the under side of the angle iron 2 forming the support for the main axle, are the rearwardly extending fingers 37 which project out beyond the rake teeth and are disposed between the same. These fingers 37 are immovable and as the rake teeth are raised, the fingers 37 act to force the hay or other material gathered by the rake teeth outward from the rake teeth.

The tumbling rakes or rakes designed to bunch the windrow formed by the main rake into loose masses called "tumbles," comprise laterally disposed frames carrying a plurality of rearwardly extending teeth arranged in a vertical series. These frames are pivoted to the main frame of the machine so that the rear ends of the tumbling rake teeth may oscillate in a horizontal plane. I have provided means whereby these tumbling rake teeth and the frames carrying them may be reciprocated or oscillated as the machine moves forward and also means whereby the tumbling rake teeth may be lifted clear of the ground when desired or disengaged from the actuating mechanism.

Referring to Figs. 1 and 2, 40 designates the side bars of the main frame of the machine, these bars being attached at their rear ends to the angle iron 2 and at their forward ends to the cross bar 30, the bars 40 projecting beyond the cross bar 30.

Carried upon the end of each bar 40 is a bracket 41, as illustrated in Fig. 4, supporting a pintle 42. This pintle is supported at its opposite ends by means of the upper and lower braces 43 and 44 which extend outward divergently from the side bar 40 of the frame.

Mounted upon the pintle 42 is a collar 45 from which extends an arm 46, this arm being in a horizontal plane and extending toward the middle of the machine. The outer end of the arm is braced and supported by means of a bracket 47 extending downward and attached to a collar 48 surrounding the lower end of the pintle 42.

The extremity of the arm 46 is formed with a knuckle 49 whereby the arm 46 may be attached to a connecting rod 50. Mounted at the base of the arm 46 is a rearwardly projecting supporting arm 51 which is braced from the arm 46 by an inclined brace 52, as illustrated very plainly in Fig. 4. The arm 51 at its extremity is attached to an angular frame bar 53 which supports the teeth 54 of the tumbling rakes. The frame bar 53 projects above the arm 51 and is provided on its extremity with a roller 55. The bar 53 extends downward and then forward and is attached at its forward end to a pair of downwardly extending spaced connected bars 56 through which pass bolts 57, to which bolts the ends of the rake teeth 54 are attached by bending the ends of the rake teeth around the bolts, in the same manner that the rake teeth 9 are bent around the transverse rod 8.

The bar 53 is also provided at spaced intervals with eyes 58 through which the rake teeth 54 pass, and by which the ends of the rake teeth are supported. The bars 56 are further supported by means of an upwardly inclined brace 59.

It will be seen that the supporting frame bar 53 and the arm 51 are rigidly attached to the arm 46 and that as a consequence as the arm 46 is oscillated, the tumbling rake teeth will also be oscillated, the frame supporting the tumbling rake teeth turning upon the pintle 42. In order to support the outer end of the frame upon which the rake teeth 54 are mounted, I provide the arcuate track 60 upon which the roller 55 travels.

The means for reciprocating the free ends of the tumbling rakes is as follows. Mounted in bearings upon the frame bars 31 and 40 is the shaft 61. The ends of the shaft pass loosely through pinions 62 which are engaged with the gear wheels 6. Mounted upon the extremities of the shaft 61 are splined clutches 63 which, when moved in one direction, engage with the teeth formed upon the hubs of the pinions 62 and when moved in the other direction disengage therefrom. The shaft 61 is provided with the cranks 64 with which the connecting rods 50 engage. As the shaft 61 is rotated, the free ends of the arms 46 will be reciprocated, thus oscillating the arms 46 upon the pintles 42 and causing the free ends of the tumbling rakes to move alternately toward and away from each other as the vehicle moves forward over the ground. This motion of the tumbling rakes will toss the hay gathered by the main rakes into a heap or "tumble" until such time as the main rakes are elevated to dump the mass of hay.

For the purpose of raising or lowering the tumbling rakes and for putting them into or out of connection with the gear wheel 6, I provide a rock shaft 64 mounted in bearings upon the frame bars 40 and 31 and provided with a lever 65 whereby the rock shaft may be operated. This lever as illustrated in Fig. 3 is mounted upon a sector 66 carried by a bracket 67 from the frame of the machine and the lever is provided with a hand-actuated pawl of any usual or desired construction and designated 68 whereby it may be engaged with the rack carried by the sector. The hand lever 65 is connected by a link 69 to an arm 70 projecting upward from the rock shaft 64. The rock shaft 64 is provided near its opposite ends with the cranked portions 71 which, as illustrated in Fig. 4, extend beneath the supporting arms 51. When the shaft 64 is rocked in one direction, the cranked portions 71 will engage with the arms 51 and raise these arms together with the rakes, these arms rotating upon the arm 46 as a center.

It is advisable that when the rake teeth are raised, the mechanism for operating the rake teeth be thrown out of engagement with the driving gear wheels 6. To this end I connect the sliding clutches 63 upon the shaft 61 to bell crank levers 72, the outwardly extending arms of the lever being connected by rods 73 to arms 74 extending downward from the extremities of the shaft 64. Thus when the shaft is rotated so as to bring the cranked portions 71 into engagement with the arms 51, these arms 74 will move the connecting rods 73 rearward, thus actuating the bell crank levers 72 and withdrawing the clutches 63 from the pinions 62. When the rock shaft 64 is actuated in the other direction so as to lower the cranked portions 71, the reverse movement occurs and the clutches 63 are thrown into engagement with the clutch members on the pinion 62.

The operation of my invention is obvious from what has gone before. Assuming that the main rakes and the tumbling rakes are both in their lowered position and the machine is moving forward, it will be obvious that the rotation of the shaft 61 will cause an oscillation of the tumbling rakes which will act to toss the hay gathered by the main rakes toward the middle of the machine. When a sufficiency of hay or like material has been gathered by the main rakes, the operator presses upon the foot lever 28, thus causing the bolts 16 to engage with the spokes of the gear wheel 6 and at the same time withdrawing the detents 35 from their engagement with the rake bar. The bolts 16 engage with the spokes of the gear wheel 6 and as the gear wheels rotate, the main rake teeth will be lifted, dumping the load. When the main rake teeth are lifted to the proper point, the rollers 18 will engage with the cams 19, thus withdrawing the bolts from engagement with the spokes of the wheels 6 and permitting the main rake to fall. When it is desired to permanently elevate the main rakes, the detents 35 are allowed to engage beneath the rake bar 11 just before this bar is tripped. By operating the lever 65, the tumbling rakes may be raised so that the machine may be backed and at the time that they are raised they are thrown out of operative engagement with the driving wheels 6. This rake may be made of any width or size or in any different sizes that may be found desirable. The weight and draft can be made as light as that of the average make of rake and the rake can be operated by one or two horses.

The width of the machine across the main rake is drawn to a scale of 7′, 10″ and if the rake is made to this scale, it will rake and pile the hay into "tumbles" 5′ wide by about 3′ high. By giving the side rakes or tumbling rakes greater sweep, the piles may be made 4′ wide by 3′ high, or by making the main axle higher than that shown in the drawings, the tumbles will be made higher.

Of course, I do not wish to limit myself to any particular details of construction as various modifications might be made without departing from the spirit of the invention.

What I claim is:

1. A gathering mechanism of the character described including a wheeled frame, oppositely disposed tumbling rakes supported at opposite ends of the wheeled frame, each rake comprising a vertically disposed series of rake teeth extending approximately parallel to the line of draft, and means for oppositely reciprocating said tumbling rakes.

2. A gathering mechanism of the character described including a wheeled frame, and complementary coacting oppositely-disposed reciprocating tumbling rakes disposed at opposite ends of the main frame, each extending rearward therefrom approximately parallel to the line of draft.

3. A gathering mechanism of the character described including a wheeled frame, oppositely placed, laterally reciprocating tumbling rakes mounted thereon at opposite ends of the frame, each rake formed of a vertically disposed series of rake teeth, and means for reciprocating both rakes simultaneously toward and from the middle of the wheeled frame.

4. A gathering mechanism of the character described including a transversely disposed main rake and oppositely placed, reciprocating tumbling rakes disposed at and closing the open ends of the main rake and reciprocating in a direction transverse to the line of draft, each of said tumbling rakes having its rake teeth disposed in a plane approximately parallel to the line of draft and movable in the space immediately in advance of the ends of the main rake.

5. A gathering mechanism of the character described including a wheeled frame, main rake teeth extending in a series transversely to the line of draft, and complementary coacting, oppositely reciprocating tumbling rakes disposed in advance of and at opposite ends of the main rake and reciprocating in a direction transverse to the line of draft toward and from the middle of the main rake, each of said tumbling rakes having its teeth disposed in a plane approximately parallel to the line of draft whereby material gathered by the main rake may be thrown toward the middle of the machine.

6. A gathering mechanism of the character described, including a wheeled frame, a transversely extending series of rake teeth extending rearward and downward from said wheeled frame, means for raising or lowering said rake teeth, oppositely placed, vertically disposed tumbling rakes having teeth arranged in a series approximately at right angles to the series of main rake teeth and extending rearward and downward, means operatively connected to the wheels supporting the frame whereby the tumbler rakes may be simultaneously reciprocated, and means for raising and lowering the tumbler rakes.

7. A gathering mechanism of the character described, including a wheeled frame, a transversely arranged series of main rake teeth, each tooth extending rearward and downward from said wheeled frame, means for raising or lowering said main rake teeth, oppositely placed vertically disposed tumbling rakes each having teeth arranged in a series disposed in a plane substantially parallel to the line of draft, said teeth extending rearward and downward, means operatively connected to the wheels supporting the frame whereby the tumbling rakes may be simultaneously reciprocated, means for raising and lowering the tumbling rakes, and means for disconnecting the tumbling rakes from their operative connection with the traction wheels.

8. A gathering mechanism of the character described, including a wheeled frame, rearwardly and downwardly extending main rake teeth supported upon the frame and extending in series transversely across the line of draft, oppositely placed vertically disposed tumbling rakes each having a plurality of rearwardly and downwardly extending teeth, all of said teeth being disposed in a vertical plane extending approximately parallel to the line of draft, said tumbling rakes being supported on the main frame at the opposite ends of the main rake, gear wheels carried by the wheels of the main frame, and rotatable therewith, and means operatively engaged with said gear wheels and connected to the tumbling rakes for simultaneously reciprocating the tumbling rakes.

9. A gathering mechanism of the character described, including a wheeled frame, oppositely placed vertically disposed rake-teeth supporting-frames pivotally mounted upon the main frame at each end thereof and having an oscillatory movement in a horizontal plane, and downwardly and rearwardly extending tumbling rake teeth attached to said frames and reciprocating therewith, the teeth of each frame being disposed in a vertical plane, and means whereby the frames may be simultaneously oscillated.

10. A gathering mechanism, including a wheeled frame, angularly disposed arms pivotally mounted upon one end of the main frame for oscillation in a horizontal plane, a rake tooth supporting bar attached to each of said arms, a plurality of tumbling rake teeth disposed in a vertical plane and carried by said bar, said rake teeth extending rearward and downward, a gear wheel rotating with the wheels of the frame, and means operated by said gear wheel and connected to the extremity of one of said arms for reciprocating the arms and the tumbler rake teeth carried thereby.

11. A gathering mechanism of the character described, including a wheeled frame, gear wheels operatively connected to the wheels of the frame to rotate therewith, inwardly extending arms pivotally attached to the main frame and rearwardly extending arms attached to the first named arms, a tumbling rake tooth supporting bar attached to each pair of said arms and extending in a vertical plane, rearwardly and downwardly extending rake teeth carried by said bar, a crank shaft driven from the gear wheels, and connections between the crank shaft and the inner ends of said arms.

12. A gathering mechanism of the character described, including a wheeled frame, gear wheels carried by the frame and rotatable with the supporting wheels thereof, oppositely placed, vertically disposed tumbling rake carrying frames pivotally mounted at each side of the main frame for movement both in a horizontal plane and a vertical plane, rearwardly and downwardly extending tumbling rake teeth carried thereby, a crank shaft mounted upon the main frame and operatively engaged with the said gear wheels, connections between the crank shaft and the free ends of the rake teeth carrying frames whereby the latter may be reciprocated, a rock shaft mounted upon the main frame and having cranked portions extending beneath and in engagement with the rake teeth carrying frames, and means for rotating said rock shaft to lift the rake teeth carrying frames.

13. A gathering mechanism of the character described, including a wheeled frame, oppositely placed, vertically disposed tumbling rakes, said rakes being rotatable in a vertical plane and in a horizontal plane, means operatively connected to the wheels of the frame for reciprocating said tumbling rakes in a horizontal plane, and hand-actuated means mounted upon the wheeled frame and engaging with the tumbling rakes for lifting the free ends of the tumbling rakes.

14. A gathering mechanism of the character described, including a wheeled frame, oppositely placed, vertically disposed tumbling rakes pivotally mounted thereon for movement in a horizontal plane and in a vertical plane, means operatively connected to the wheels of the frame for reciprocating said tumbling rakes in a horizontal plane, manually operated means engaging said tumbling rakes for raising the free ends of the rakes in a vertical plane, and means for simultaneously disengaging the tumbling rakes from their operative connection with the wheels of the frame.

15. A gathering mechanism of the character described including a wheeled frame, main rake teeth supported upon the frame and extending rearward and downward therefrom, oppositely placed, vertically disposed tumbling rakes mounted at oppositely ends of the main rake, means operatively connected to the wheels of the frame for reciprocating said tumbling rakes, and manually operated means for connecting said main rake with the wheels of the frame for lifting the teeth by the rotation of said wheels.

16. A gathering mechanism of the character described, including a wheeled frame, oppositely placed laterally reciprocating tumbling rakes supported thereon and each having its teeth extending in a vertical plane approximately parallel to the line of draft of the wheeled frame, means operatively connected to the traction wheels for reciprocating said tumbling rakes, and means for lifting said tumbling rakes out of operative position.

17. A gathering mechanism of the character described, including a wheeled frame, a main rake mounted upon the wheeled frame and extending transversely thereof and having downwardly extending rake teeth, means for raising or lowering said main rake, oppositely placed tumbling rakes disposed at the ends of the main rake and each having a series of teeth arranged in vertical planes parallel to the line of draft, means for raising or lowering the main rake teeth, means for simultaneously raising or lowering the tumbling rakes, and means for simultaneously disengaging the tumbling rakes from operative connection with the traction wheels of the frame.

18. A gathering mechanism of the character described, including a main frame, supporting traction wheels mounted upon the main frame, gear wheels mounted upon the traction wheels and having radially extending members, a horizontally disposed series of main rake teeth pivotally mounted upon the main frame and extending rearward and downward, a transverse bar connecting all of the rake teeth, bolts mounted on opposite ends of the bar and shiftable into engagement with the radial members of the gear wheels, each of said bolts having a downwardly projecting member, cams mounted upon the main frame of the machine in the path of movement of the said downwardly projecting members of the bolts and adapted to retract said bolts, manually actuative means mounted upon the main frame for projecting said bolts, means for normally holding the bolts retracted, and detents mounted upon the main frame and operatively connected to the means for actuating the bolts, said detents being shiftable by the actuation of the bolts into or out of engagement with the transverse bar connecting the teeth.

19. A gathering mechanism of the character described, including a wheeled frame, a horizontally disposed series of downwardly and rearwardly extending main teeth, means for raising and lowering said main teeth, oppositely placed, vertically disposed tumbling rakes having a plurality of rake teeth disposed in a vertical series, said tumbling rakes being mounted upon the main frame adjacent to the wheels thereof, the tumbling rake teeth extending rearward and downward, means operatively connected to the wheels of the frame for reciprocating said tumbling rakes in a horizontal plane, and manually actuated means for raising or lowering the free ends of the tumbling rakes and simultaneously disconnecting or connecting the operative mechanism of the tumbler rakes from engagement with the driving mechanism.

20. In a rake, the combination with a horizontally disposed series of rearwardly extending, downwardly curved main rake teeth, of oppositely disposed tumbling rakes mounted at opposite ends of the main rake and forward thereof, the teeth of said tumbling rakes being disposed in a vertical series, and means for oppositely reciprocating the tumbling rakes toward and from the middle of the machine.

In testimony whereof, I affix my signature in presence of two witnesses.

JOSEPH MARTIN. [L. S.]

Witnesses:
W. M. McGRATH,
T. M. DEVINEE.

Copies of this patent may be obtained for five cents each, by addressing the "Commissioner of Patents, Washington, D. C."